(No Model.)

I. H. JOHNSON.
VEHICLE.

No. 473,881. Patented Apr. 26, 1892.

Witnesses
E. J. Curren
John Walsh

Inventor
Ira H. Johnson
By his Attorneys
Alexander & Davis

UNITED STATES PATENT OFFICE.

IRA H. JOHNSON, OF PAW PAW, MICHIGAN, ASSIGNOR OF ONE-HALF TO R. M. BUCK, OF SAME PLACE.

VEHICLE.

SPECIFICATION forming part of Letters Patent No. 473,881, dated April 26, 1892.

Application filed January 26, 1892. Serial No. 419,342. (No model.)

*To all whom it may concern:*

Be it known that I, IRA H. JOHNSON, a citizen of the United States, residing at Paw Paw, in the county of Van Buren and State of Michigan, have invented certain new and useful Improvements in Vehicles, of which the following is a specification, reference being had therein to the accompanying drawings, in which—

Figure 1:
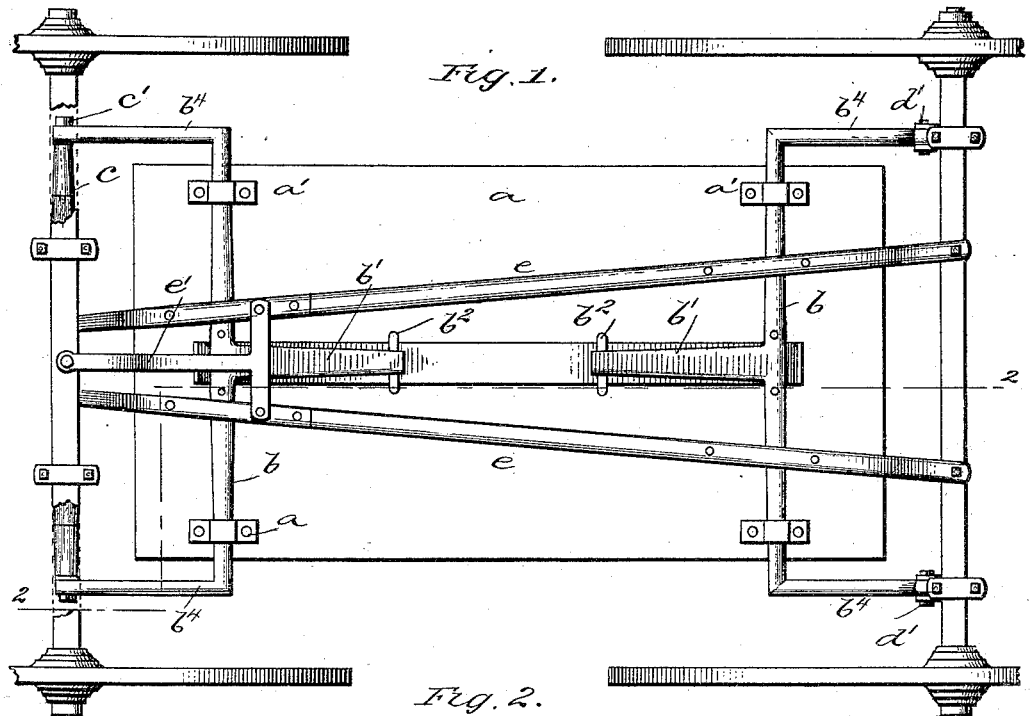
Figure 2:
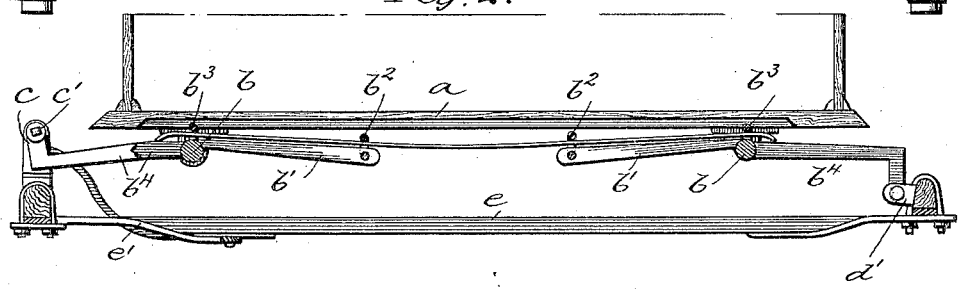
Figure 3:
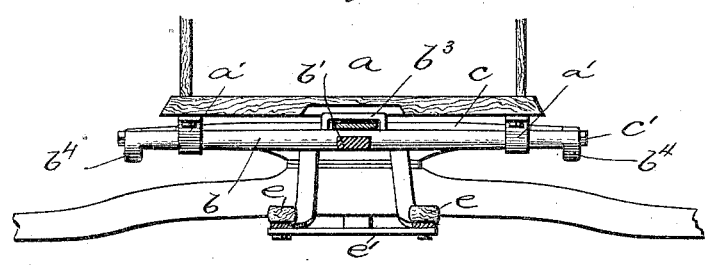

Figure 1 is a bottom view of a buggy provided with my improvements; Fig. 2, a vertical longitudinal sectional view thereof, and Fig. 3 a transverse sectional view.

The nature and object of the invention will be fully understood from the following description, taken in connection with the drawings attached.

In the drawings, $a$ designates the bottom of any suitable vehicle, such as a buggy, which is provided on its under side with four bearings $a'$, one pair being secured near each end of the bottom. Journaled in each pair is a transverse rock-shaft $b$, which is provided with a central horizontal arm or lever $b'$, both these arms extending in toward the center of the bottom of the vehicle and each being provided with an upwardly-extending loop $b^2$ at its inner end. These arms are in line with the central line of the vehicle and they terminate a suitable distance from each other, preferably about one-third of the distance between the rock-shafts. Each of the rock-shafts is provided with an upwardly-extending loop $b^3$ about midway its ends in line with the pivotal loops on the ends of the arms, and through which (these four loops) extends a long flat spring slightly turned down at its ends to prevent accidental displacement from the loops. On the ends of the rock-shafts are formed integral right-angle arms $b^4$, the front set projecting forwardly and pivotally secured directly to the respective ends of the pivotal head-block $c$ of the vehicle by horizontal bolts $c'$, screwed into the ends of the same, while the rear pair extend rearwardly and are pivotally connected to rigid clips $d'$ on the rear axle $d$. At their rear ends the rear arms are provided with downwardly-turned elbows, and the front arms at their extreme forward ends are provided with upwardly-turned elbows, as shown most clearly in Fig. 2. The two rearwardly-diverging reach-bars $e$ rigidly connect the head-block and rear axle, and a T-brace $e'$ rigidly connects the front ends of the reach-bars to the lower end of the king-bolt.

This construction has a number of advantages. While in motion the body of the vehicle has imparted to it by the longitudinal spring an easy resilient movement, and the arrangement of the loops on the arms and rock-shafts renders the vehicle entirely free from all endwise and sidewise swaying, thereby keeping the body always level, irrespective of the position of the load in the vehicle. The arrangement of rock-shafts and elbows insures an equalizing motion to the body of the vehicle, both shafts being compelled to work in absolute unison, as there are no loose link connections between them and the axles and vehicle, as is evident.

The invention is extremely simple in construction and neat in appearance, and also inexpensive and durable.

Having thus fully described my invention, what I claim, and desire to secure by Letters Patent, is—

1. The combination, with the axles and a vehicle body, of a rock-shaft journaled thereon at each end, the front shaft being provided with forwardly-extending arms pivotally connected to the head-block and the rear shaft with rearwardly-extending arms pivotally connected to the rear axle, downwardly-extending elbows being formed on the ends of one pair of arms and upwardly-extending elbows being formed on the ends of the other set of arms, and a spring attached to the vehicle for holding the rock-shafts in their normal positions, substantially as described.

2. The combination, with a vehicle, of a rock-shaft journaled near each end of the body thereof and provided with bent arms pivotally connected to the rear axle and head-block, said shafts being also provided with inwardly-projecting arms carrying loops, and a longitudinal spring connecting the rock-shafts and passing through the loops on the arms, substantially as described.

3. The combination of a vehicle, a rock-shaft journaled across the bottom thereof at each end, these shafts being provided at their ends with bent arms pivotally connected to the head-block and axle, and also provided with inwardly-extending arms carrying loops at their ends, a loop secured to each of the rock-shafts, and a longitudinal flat spring extending through the said loops, substantially as described.

In testimony whereof I affix my signature in presence of two witnesses.

IRA H. JOHNSON.

Witnesses:
DAVID DILLON,
F. E. STEVENS.